(12) United States Patent
Chen

(10) Patent No.: US 6,688,565 B1
(45) Date of Patent: Feb. 10, 2004

(54) MULTI-LEG STAND

(75) Inventor: Kevin Chen, Taipei (TW)

(73) Assignee: Kupo Co., Ltd., Taipei (TW)

( * ) Notice: Subject to any disclaimer, the term of this patent is extended or adjusted under 35 U.S.C. 154(b) by 0 days.

(21) Appl. No.: 10/260,565

(22) Filed: Oct. 1, 2002

(51) Int. Cl.$^7$ .............................................. F16M 11/38
(52) U.S. Cl. ..................... 248/166; 248/188.7; 248/436
(58) Field of Search ................................ 248/166, 167, 248/188.7, 163.1, 436

(56) References Cited

U.S. PATENT DOCUMENTS

| | | | | |
|---|---|---|---|---|
| 1,921,026 A | * | 8/1933 | Garman | 248/158 |
| 2,706,609 A | * | 4/1955 | Sullivan | 248/167 |
| 4,377,269 A | * | 3/1983 | Sellner | 248/188.6 |
| 5,871,185 A | * | 2/1999 | Phillips et al. | 248/167 |
| 6,138,977 A | * | 10/2000 | Tsai | 248/523 |

FOREIGN PATENT DOCUMENTS

| | | | | |
|---|---|---|---|---|
| WO | WO-9013240 | * | 11/1990 | 248/166 |

* cited by examiner

*Primary Examiner*—Korie Chan
(74) *Attorney, Agent, or Firm*—Rabin & Berdo, P.C.

(57) ABSTRACT

A multi-leg stand mainly includes a vertical main tube and a tripod structure connected to a lower end of the main tube. The tripod structure includes an inner tube around which a locking element and three unions are sequentially mounted from top to bottom. Three legs are separately connected at inner ends to the three unions. When the locking element engages with the first union at a first locking position, the three legs are folded to locate at the same side of the main tube, and when the locking element engages with the first union at a second locking position, the three legs are equally angularly spaced and radially extended. And, when the locking element is in a releasing position on the inner tube, the three unions may be freely turned in one direction with only one hand to quickly and accurately move into the folded or the spaced position.

11 Claims, 13 Drawing Sheets

MULTI-LEG STAND

FIELD OF THE INVENTION

The present invention relates to a multi-leg stand, and more particularly to a tripod having a locking element that can be vertically moved to equally angularly space three legs of the tripod to stably support a vertical main tube or to fold the three legs to one side of the main tube for easily storage of the tripod. The locking element also enables the legs in the spaced position to stand stably without the risk of unexpected folding thereof.

BACKGROUND OF THE INVENTION

A tripod is frequently used to support a camera in taking a photo, particularly in professional photography, or to support a lighting fixture on a stage. FIGS. 1A to 1D shows the structure of a currently available tripod. As shown, the tripod includes a hollow connecting bar 91, into which a vertical tube (not shown) is inserted to support a lighting fixture or other photographic apparatus on a top thereof; a turning bolt 92 horizontally screwed into the connecting bar 91 for conveniently fixing or loosening the vertical tube to or from the connecting bar 91; and four turning elements 81, 82, 83, and 84 sequentially connected to a lower end of the connecting bar 91 from top to bottom.

As can be more clearly seen from FIGS. 1C and 1D, the second, the third, and the fourth turning element 82, 83, and 84 respectively have a leg 93 sideward extended from a wall thereof. All the legs 93 have a downward bent distal end. Please refer to FIG. 1D. The first turning element 81 is fixed to the lower end of the connecting bar 91 and has a V-shaped notch 81a provided at a lower edge thereof for engaging with a reverse V-shaped projection 82a provided on an upper edge of the second turning element 82 to restrain the second turning element 82 from turning relative to the first turning element 81. The second turning element 82 is provided at a lower edge with two notches 82b and 82c for selectively engaging with a projection 83a provided on an upper edge of the third turning element 83. Similarly, the third turning element 83 is provided at a lower edge with a projection 83b for selectively engaging with one of two notches 84a, 84b provided on an upper edge of the fourth turning element 84.

The conventional tripod shown in FIGS. 1A to 1D also includes an upper central tube 98, a lower central tube 99, and a bottom cap 96 sealing a lower end of the lower central tube 99. The four turning elements 81 to 84 are actually sequentially mounted around the upper and the lower central tube 98, 99. A bolt 95 is disposed in the central tubes 98, 99 to downward extend a lower end through the bottom cap 96 to engage with a nut 97. A spring 94 is put around the bolt 95 at a section thereof located in the lower central tube 99. When the spring 94 is elastically extended, the third and the fourth turning element 83, 84 are allowed to disengage from each other to turn about the lower central tube 99. At this point, an operator may select to engage the projection 83b with one of the two notches 84a and 84b for the legs 93 to space from one another for use, as shown in FIG. 1A, or to locate at the same side for storage, as shown in FIG. 1B.

In the above-described conventional tripod, it is the spring 94 that controls the locating of the turning elements 83, 84 and the legs 93. With this structure, the legs 93 of the tripod tend to move and cause dangers when they are unexpectedly impacted or collided. When the tripod with the legs in the spaced position is tilted over due to any external force, the photographic apparatus or lighting fixture supported on the tripod would become damaged, and workers nearby the tripod might be injured.

Another problem with the above-described conventional tripod is the third and the fourth turning element 83, 84 may be freely turned leftward or rightward. A negligent operator might have to take more time to set the turning elements 83, 84 and the legs 93 to their correct positions.

Moreover, due to a pull force of the spring 94, the operator must apply a consideraby large force to disengage the projection 83b from the notch 84a or 84b in order to turn the turning elements 83, 84. Under this condition, the turning of the turning elements must be completed with two hands and is therefore inconvenient to the operator.

SUMMARY OF THE INVENTION

It is therefore a primary object of the present invention to provide a multi-leg stand having legs that could be conveniently angularly spaced or folded by an operator with only one hand.

Another object of the present invention is to provide a multi-leg stand having legs that are not subject to the risk of unexpected folding even if they are impacted by a strong external force.

To achieve the above and other objects, the multi-leg stand of the present invention mainly includes a vertical main tube and a tripod structure connected to a lower end of the main tube. The tripod structure includes an inner tube around which a locking element and three unions are sequentially mounted from top to bottom. Three legs are separately connected at inner ends to the three unions. When the locking element engages with the first union at a first locking position, the three legs are folded to locate at the same side of the main tube, and when the locking element engages with the first union at a second locking position, the three legs are equally angularly spaced and radially extended. And, when the locking element is in a releasing position on the inner tube, the three unions may be freely turned in one direction with only one hand to quickly and accurately move into the folded or the spaced position.

Since the locking element must be manually pushed upward to enable turning of the unions, the unions are always firmly held to the locked position after the legs are moved to their spaced position without the risk of being unexpectedly folded.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
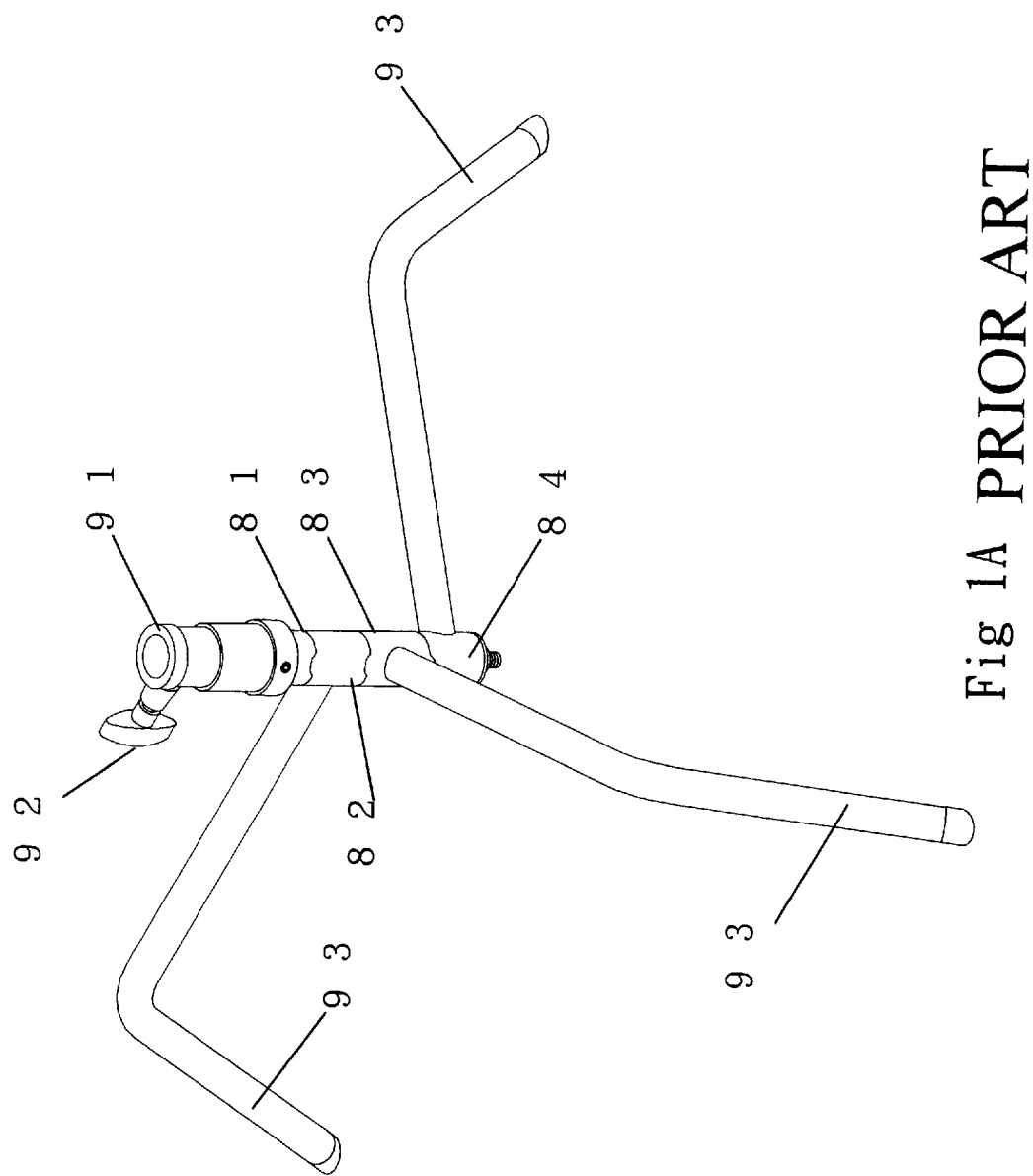
FIG. 1A is a perspective view of a conventional tripod with three legs thereof in a spaced position.
Figure 1B:
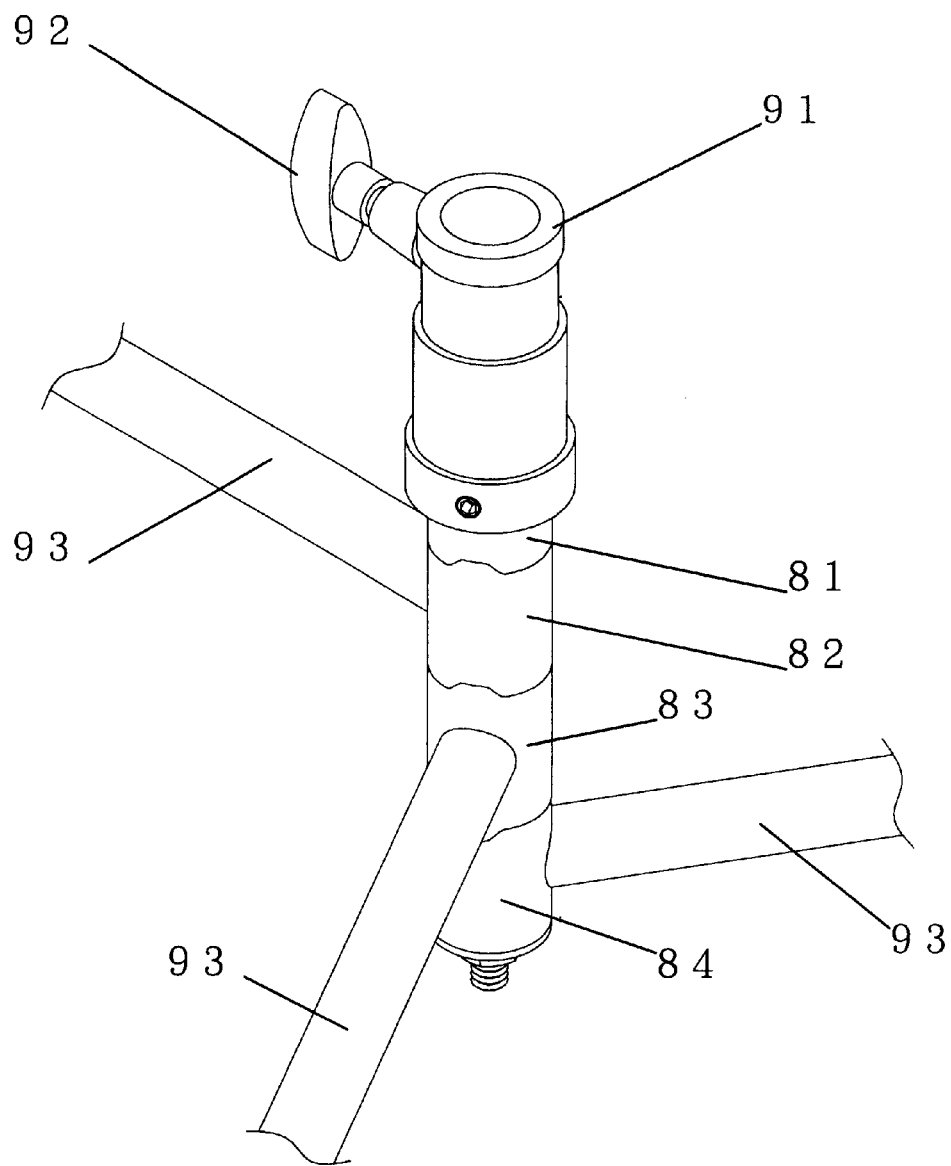
FIG. 1B is a perspective view of the conventional tripod of FIG. 1A with three legs thereof in a folded position.
Figure 1C:
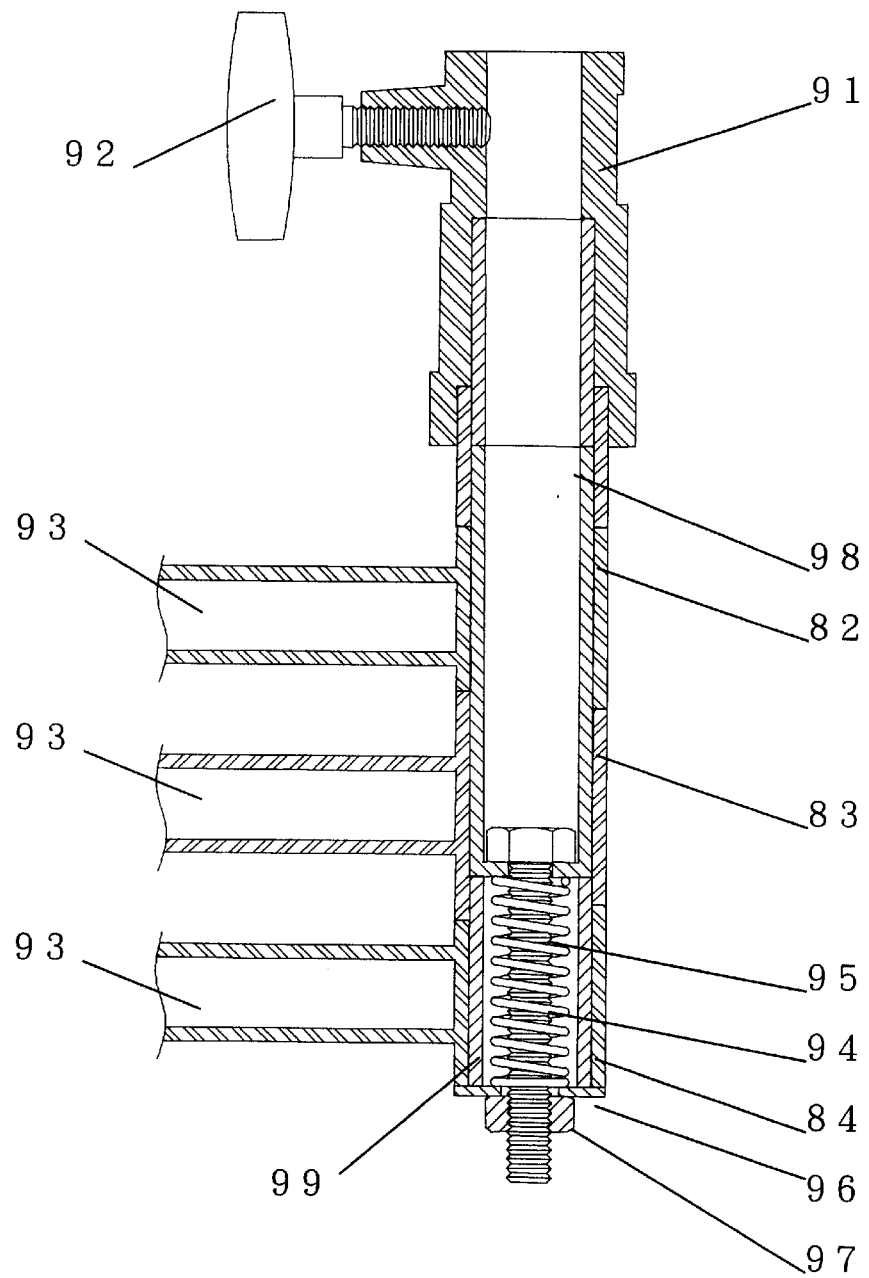
FIG. 1C is a sectional view of the conventional tripod of FIG. 1A with three legs thereof in a folded position.
Figure 1D:
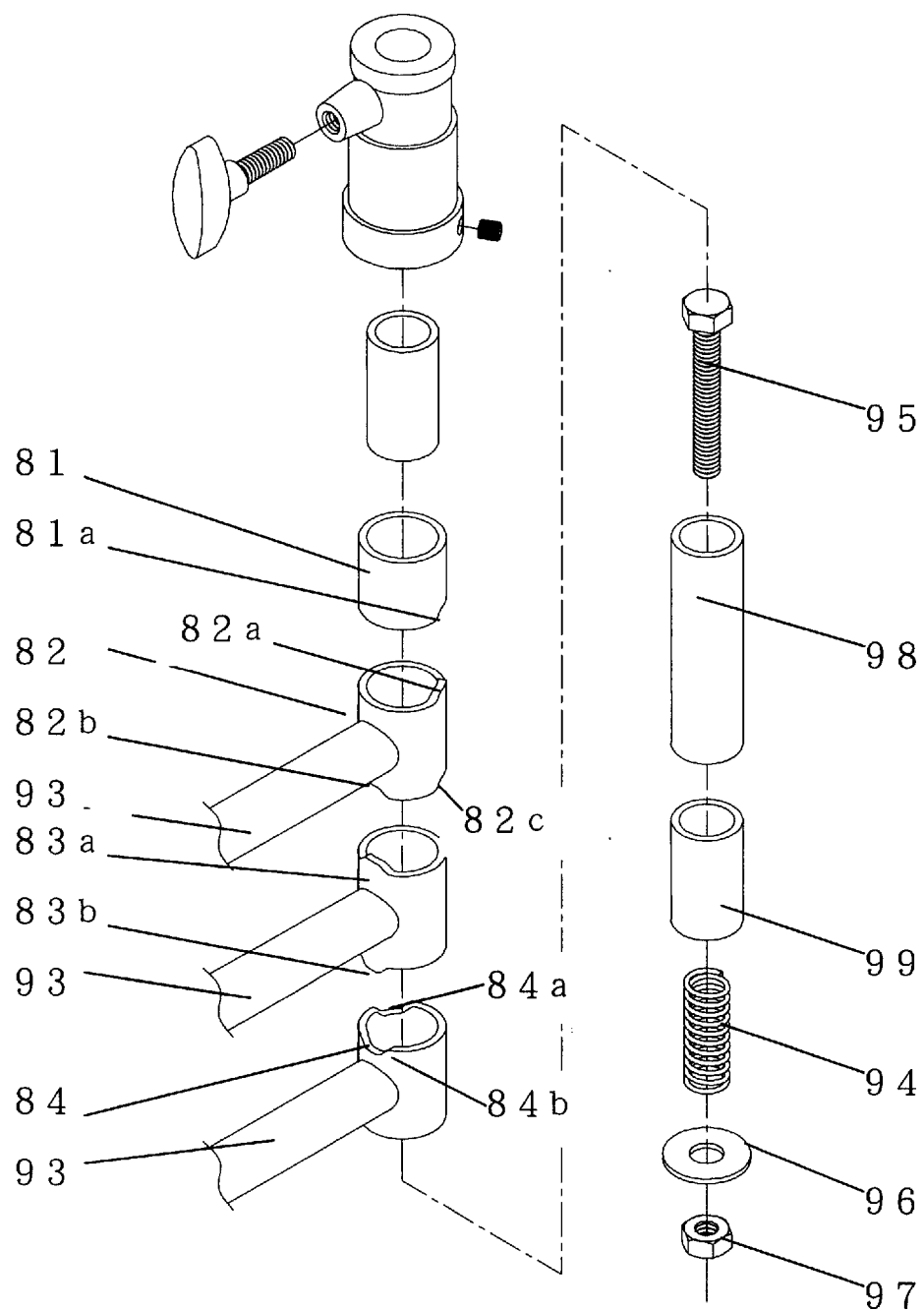
FIG. 1D is an exploded perspective view of the conventional tripod of FIG. 1A.
Figure 2:
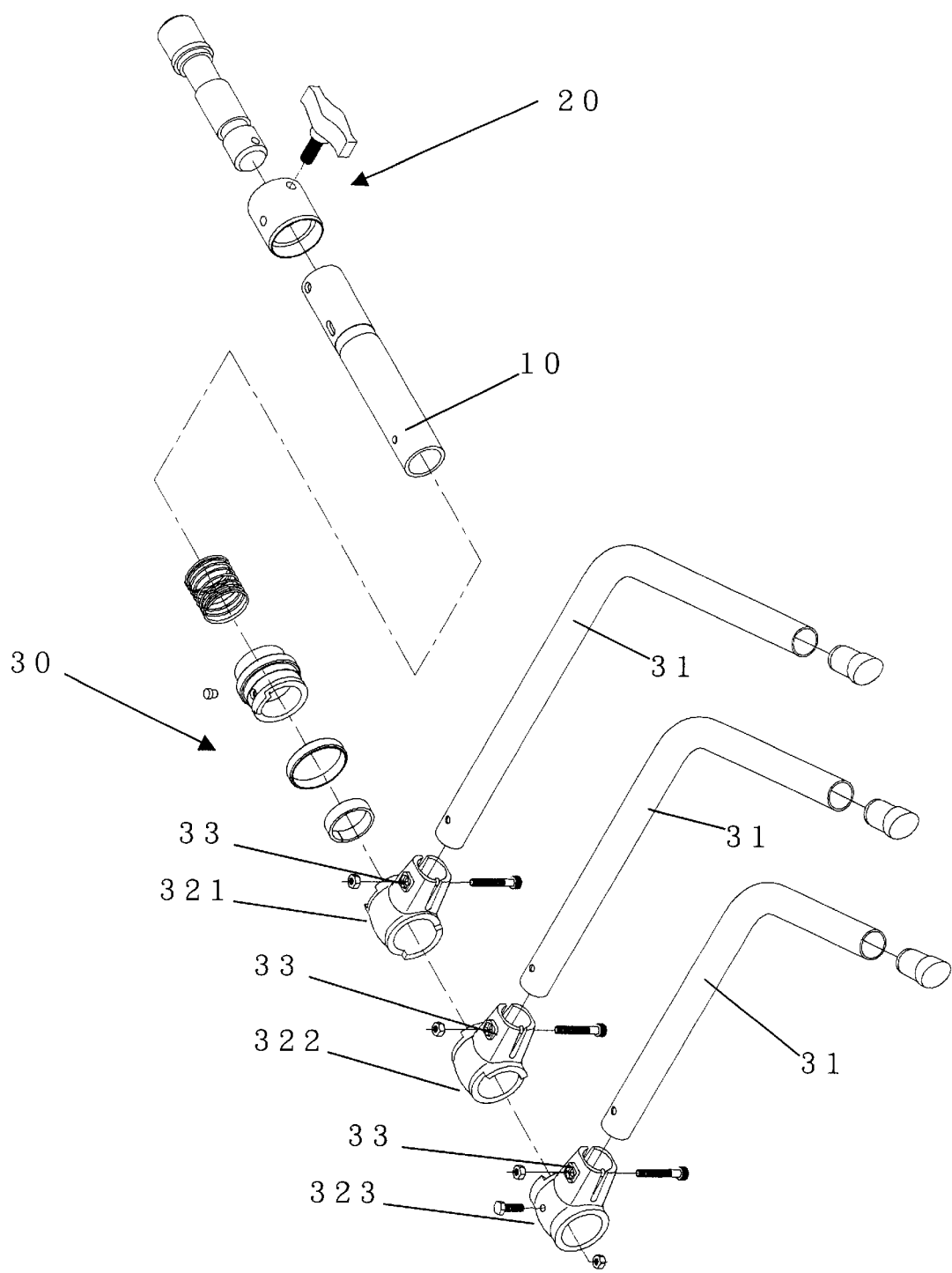
FIG. 2 is an exploded perspective view of a multi-leg stand according to a preferred embodiment of the present invention, in which three legs are provided.

Please refer to FIG. 2 that is an exploded perspective view of a multi-leg stand according to a preferred embodiment of the present invention. As shown, the multi-leg stand mainly includes a vertically extended main tube 10, a set of connecting elements 20 mounted to an upper end of the main tube 10 for connecting a lighting fixture or a photographic apparatus to a top of the multi-leg stand, and a tripod structure 30 mounted to a lower end of the main tube 10.

Figure 3:
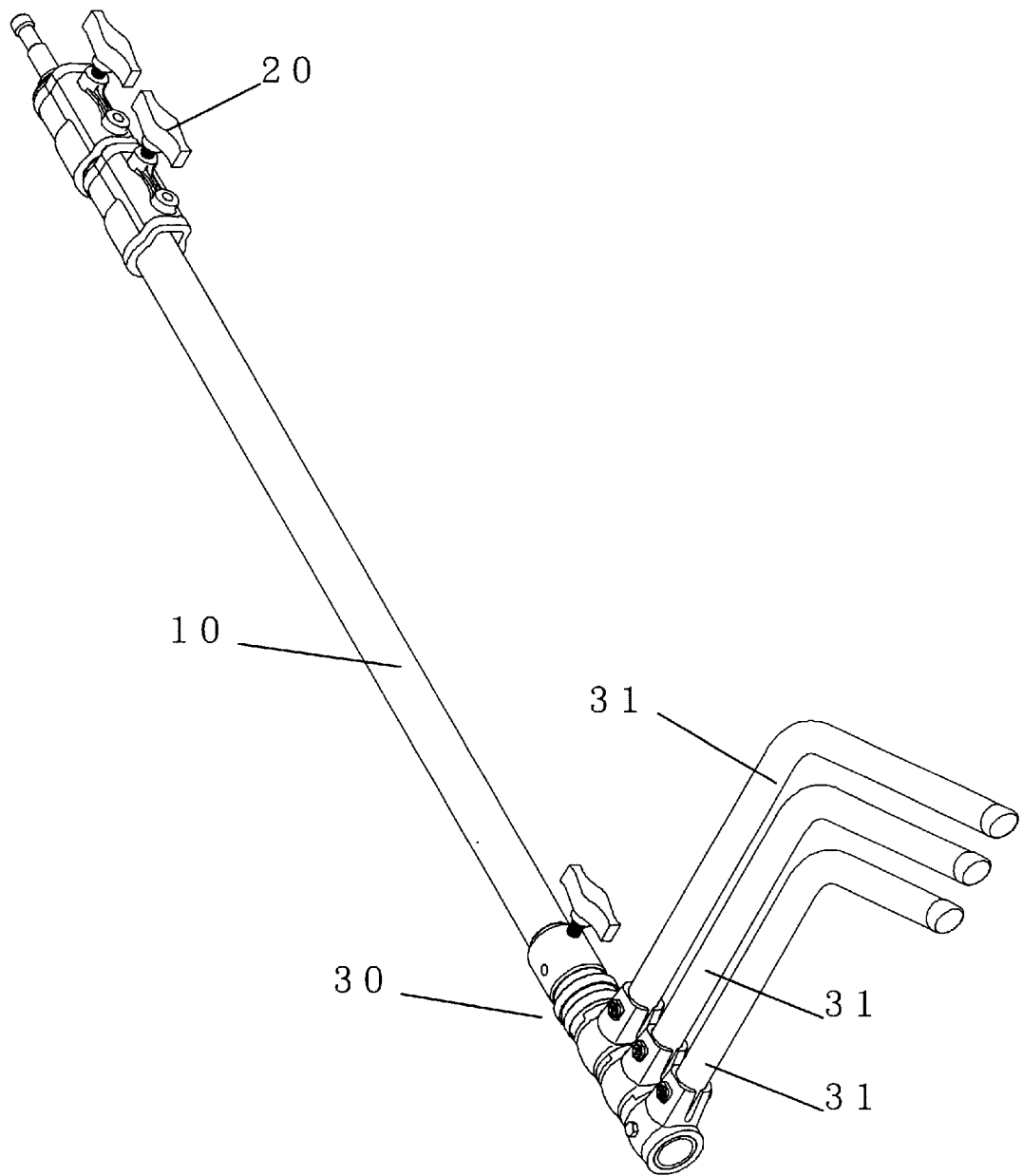
FIG. 3 is an assembled perspective view of FIG. 2 with the three legs thereof in a folded position.
Figure 4:
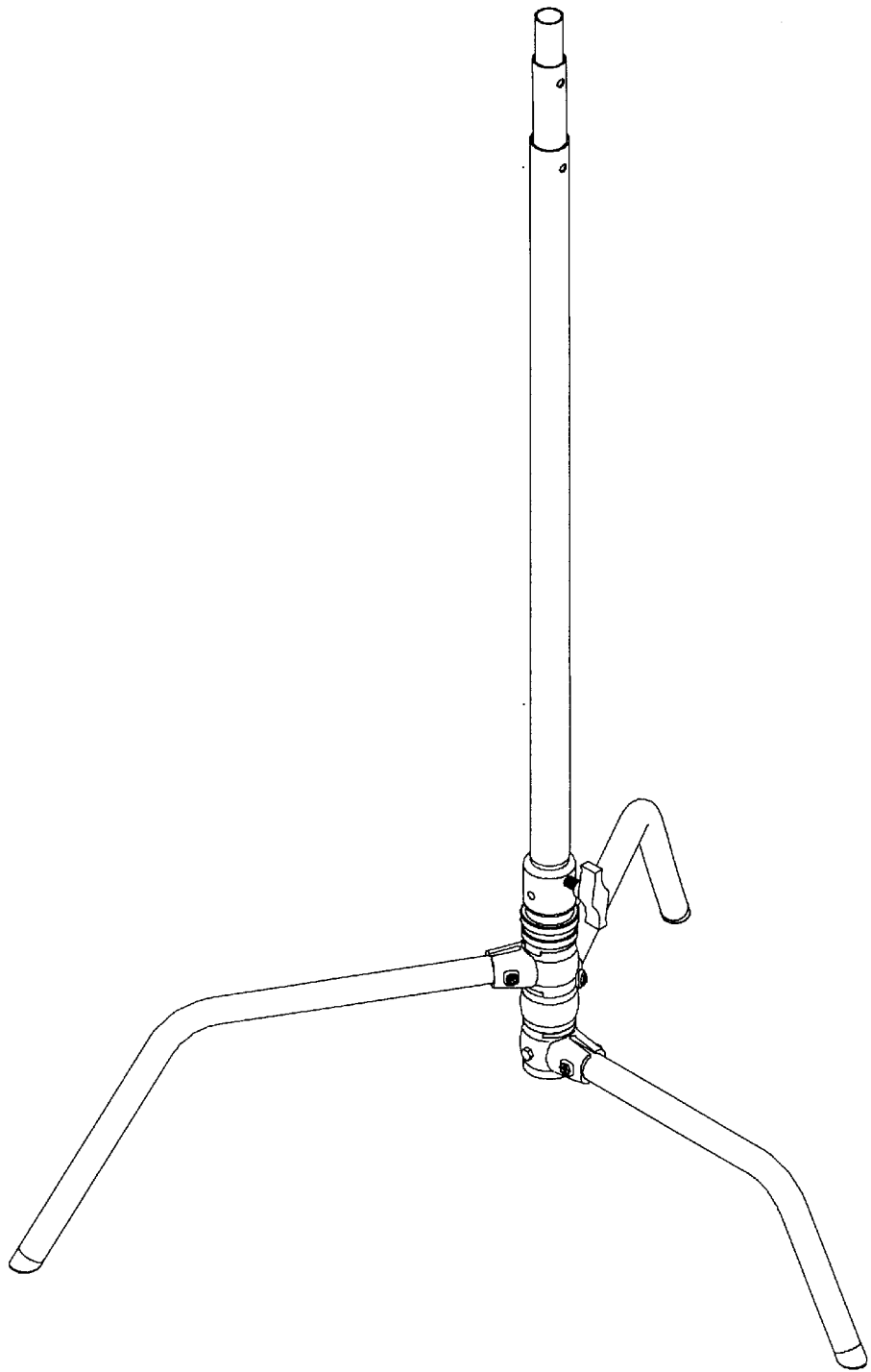
FIG. 4 is an assembled-perspective view of FIG. 2 with the three legs thereof in a spaced position.

The tripod structure 30 mainly includes three sequentially vertically arranged legs 31, each of which includes a horizontal inner section and a downward bent vertical outer section; and first, second, and third unions 321, 322, 323, each of which has a sideward projected coupling sleeve 33 for tightly receiving a proximal end of one leg 31 therein, and the legs 31 are firmly held to the coupling sleeves 33 by means of three sets of screws and nuts S1. The three legs 31 are horizontally movable between a folded position, as shown in FIG. 3, and a spaced position, as shown in FIG. 4. When the three legs 31 are in the spaced position, they are able to support the main tube 10 in an upright position. For the three legs 31 to stand stably in the spaced position, a soft pad 311 having a slant bottom surface is attached to a distal end of the vertical section of each leg 31.

Figure 5:
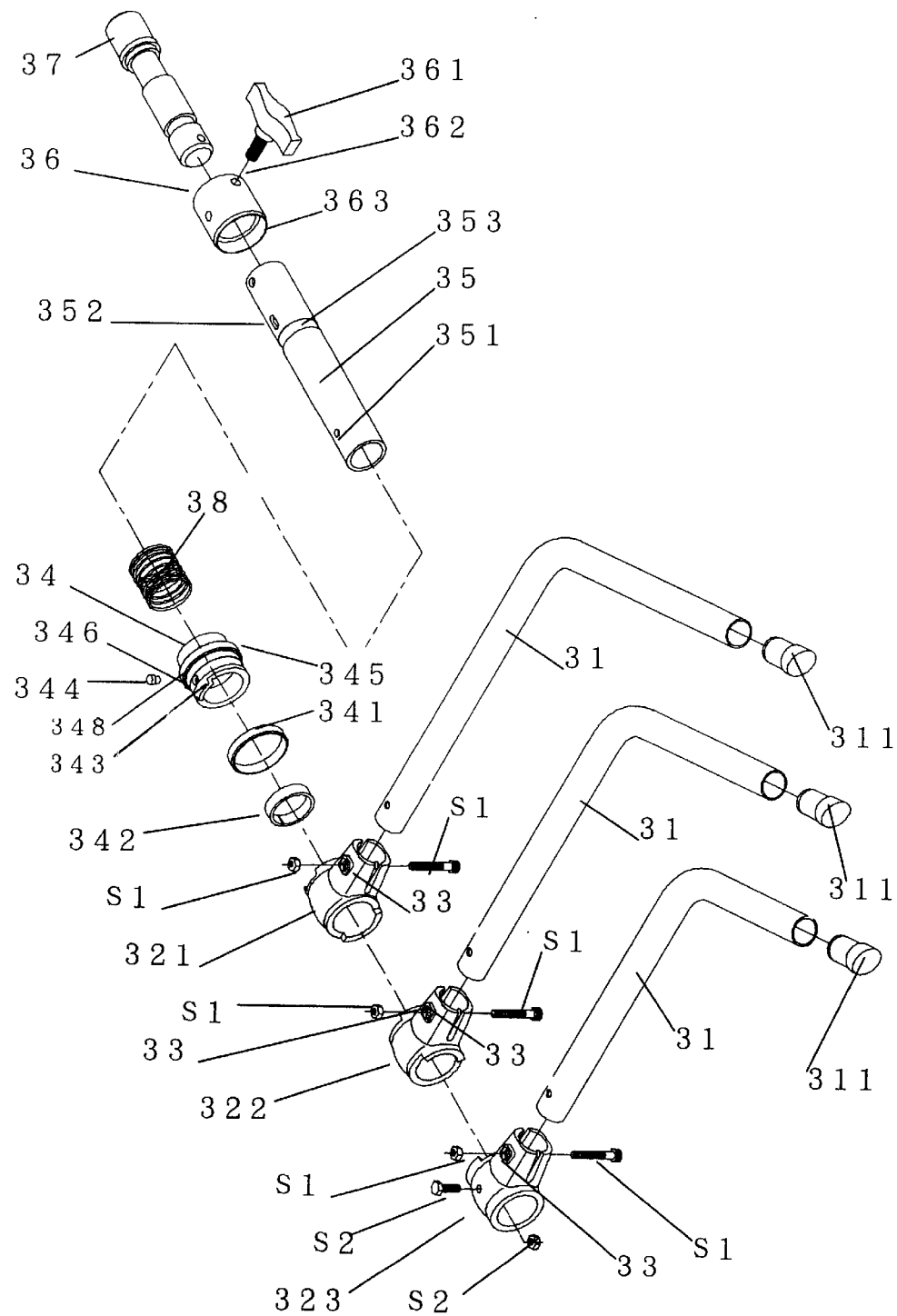
FIG. 5 is an exploded perspective view of a tripod structure of the multi-leg stand of FIG. 2.
Figure 6:
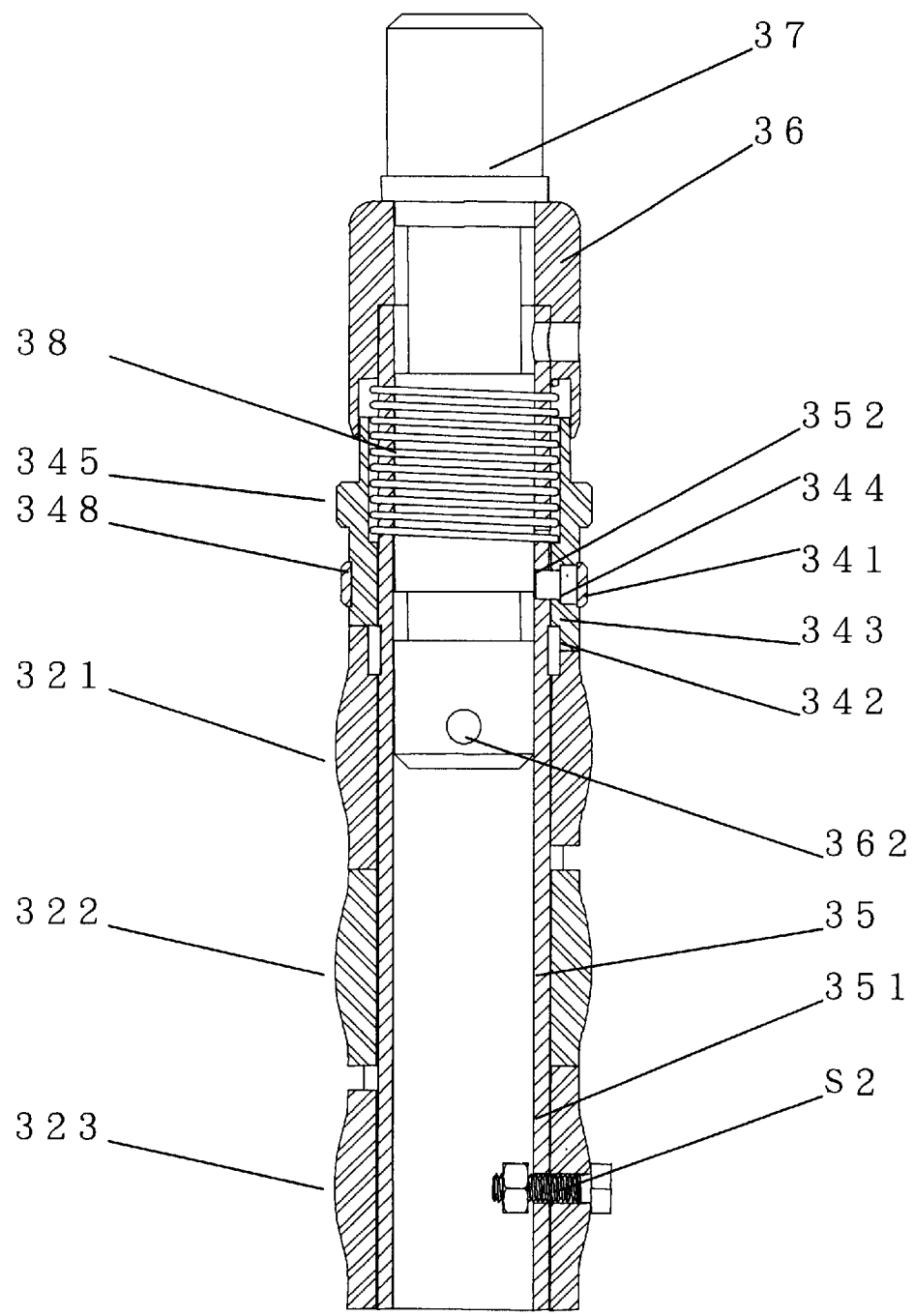
FIG. 6 is an assembled sectional view of FIG. 5.

Please refer to FIG. 5 that is a detailed exploded perspective view of the tripod structure 30, and to FIG. 6 that is an assembled sectional view of FIG. 5. As shown, the tripod structure 30 further includes an inner tube 35, around which an upper fixing sleeve 36, a locking element 34, and the first, the second, and the third unions 321, 322, 323 are sequentially mounted from top to bottom. Wherein, the third union 323 is fixedly connected to a lower end of the inner tube 35 by means of a set of screw and nut S2 engaged with a through hole 351 provided on the inner tube 35. The upper fixing sleeve 36 has an upper inner bore as large as an inner diameter of the inner tube 35, allowing the upper fixing sleeve 36 to be supported on an upper end of the inner tube 35. A connecting bar 37 is downward extended into the inner tube 35 via the upper fixing sleeve 36 and be held thereto by means of a locking bolt 361 screwed into a threaded hole 362 provided near an upper end of the upper fixing sleeve 36. The vertical main tube 10 (not shown in FIGS. 5 and 6) is then mounted around an upper end of the connecting bar 37.

Figure 7:
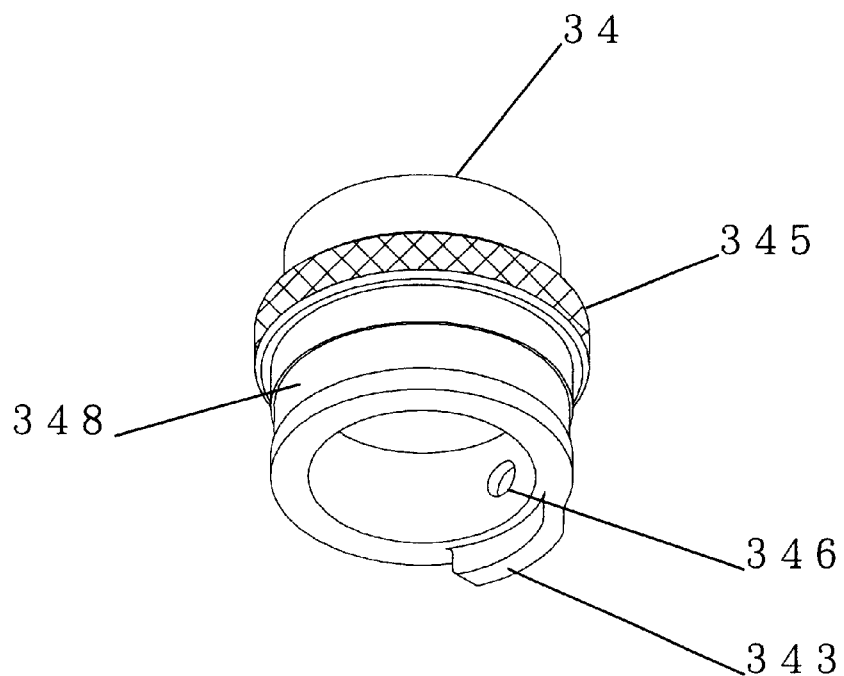
FIG. 7 is an enlarged bottom perspective view of a locking element included in the tripod structure of the multi-leg stand of the present invention.
Figure 7A:
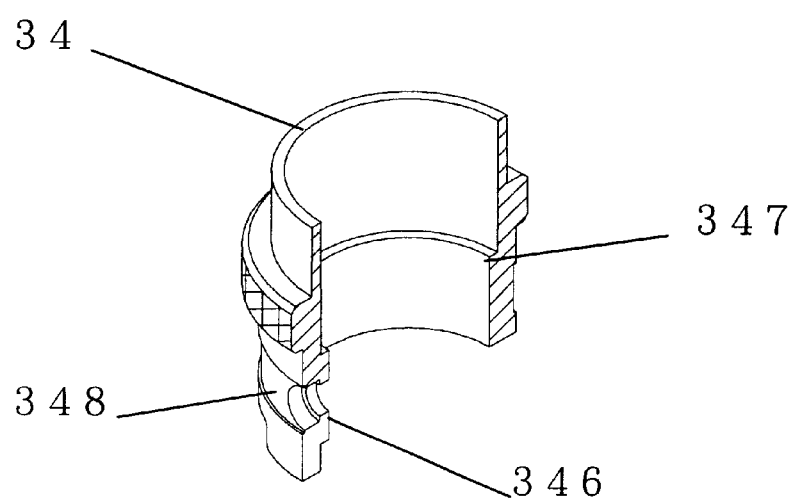
FIG. 7A is a partially cutaway top perspective view of the locking element of FIG. 7.

The locking element 34, as shown in FIGS. 7 and 7A, is a hollow tubular member. The locking element 34 is formed on an inner surface with a step 347 to produce a diameter-reduced inner lower bore, which is large enough for the locking element 34 to mount on the inner tube 35 in a loose fit relation and thereby slidably move along the inner tube 35, and a diameter-increased inner upper bore, which together with an outer surface of the inner tube 35 define a space between them for receiving a spring 38 therein. The locking element 34 is externally provided with an expanded portion 345, an outer surface of which is embossed with textures to enable a user to easily slide the locking element 34 with one hand relative to the inner tube 35. A reduced annular portion 348 is formed below the expanded portion 345 and has a cotter hole 346 provided thereat. A cotter 344 is extended through the cotter hole 346 to engage a body of the cotter 344 with a wall of the inner tube 35. A collar 341 is put around the reduced annular portion 348 to cover the cotter 344 and prevent the same from separating from the inner tube 35 and the locking element 34. A first engaging block 343 is downward projected from a lower edge of the locking element 34 to abut on an upper end of a C-ring 342 mounted around a reduced annular portion 353 of the inner tube 35.

The upper fixing sleeve 36 has an expanded lower inner bore 363, which together with the outer surface of the inner tube 35 define a space between them to receive an upper end of the spring 38 therein. That is, the spring 38 is located around an upper part of the inner tube 35 between the upper fixing sleeve 36 and the locking element 34 to normally push the locking element 34 downward to a locking position, as shown in FIG. 6. However, by holding at the expanded portion 345 of the locking element 34 and applying an upward force, the spring 38 can be compressed to allow the locking element 34 to slide upward to a releasing position. Since the cotter 344 is extended through the cotter hole 346 into an axially extended long slot 352 provided on the wall of the inner tube 35, the locking element 34 is limited to slide upward by a distance defined by the long slot 352 and is restrained from rotating relative to the inner tube 35. When the locking element 34 is slid upward to the releasing position, the first and the second unions 321, 322 located below the locking element 34 are allowed to freely rotate about the inner tube 35.

Figure 8A:
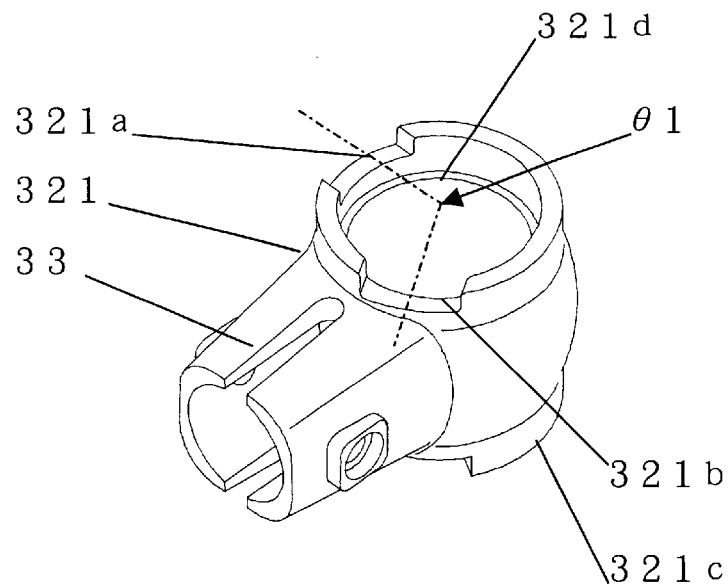
FIGS. 8A and 8B are enlarged top and bottom perspective views, respectively, of a first union included in the present invention.
Figure 8B:
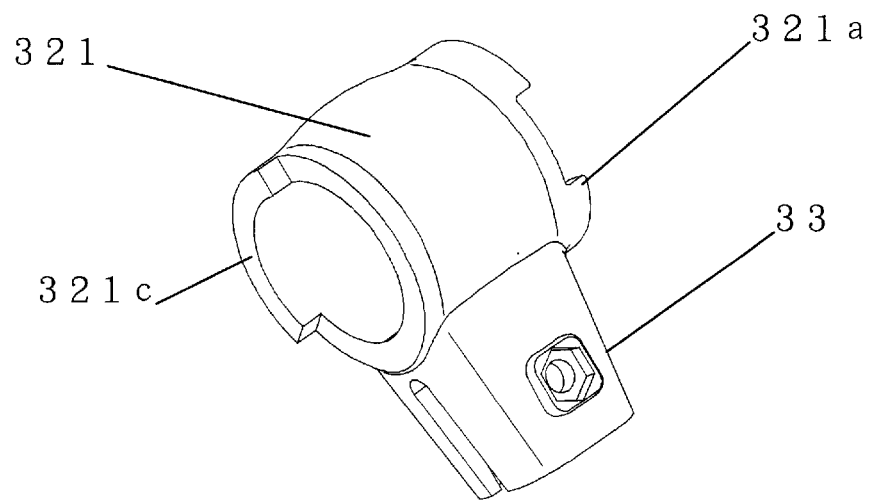

Please also refer to FIGS. 8A and 8B. The first union 321 has an inner bore large enough for it to mount on the inner tube 35 in a loose fit relation. However, there is a step 321d formed on an upper inner wall surface of the inner bore to produce an increased upper inner bore for receiving a lower end of the C-ring 342. The first union 321 is provided along an axially extended upper flange with two spaced engaging recesses, that is, a first and a second engaging recess 321a and 321b. That is, the two recesses 321a, 321b are located on the same circumference with their center points spaced from each other by an angle θ1 of 240°. The first engaging block 343 downward projected from the lower edge of the locking element 34 in the locking position is adapted to engage with one of the first and the second recess 321a, 321b into a first and a second locking position, respectively. The first union 321 is provided on an axially extended lower flange at a predetermined position with a downward projected second engaging block 321c, which extends in a circumferential direction by 120°.

Figure 9A:
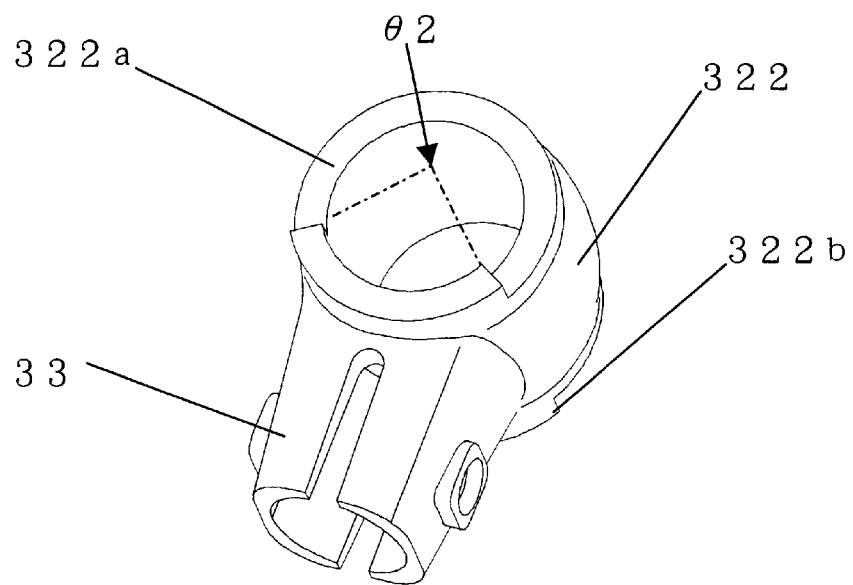
FIGS. 9A and 9B are enlarged top and bottom perspective views, respectively, of a second union included in the present invention.
Figure 9B:
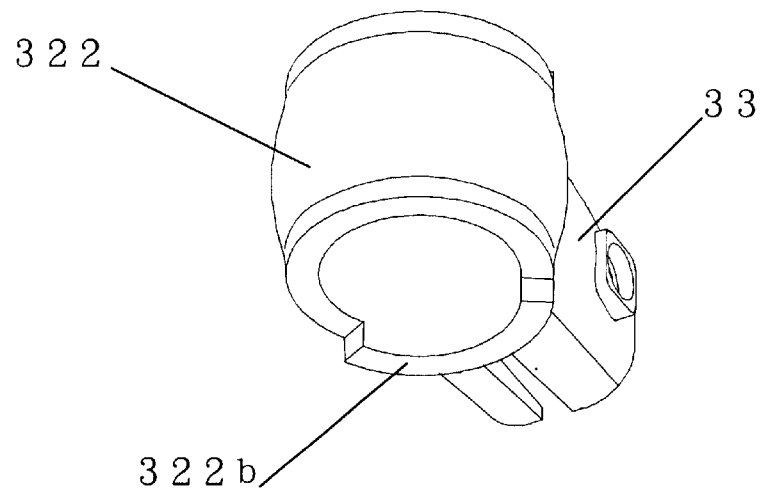

Please refer to FIGS. 9A and 9B. The second union 322 has an inner bore large enough for it to mount on the inner tube 35 in a loose fit relation. A third engaging recess 322a is formed on anaxially extended upper flange of the second union 322 to extend in a circumferential direction by an angle θ2 of 240°. The 120°-wide second engaging block 321c of the first union 321 is adapted to interfere with the 240°-wide third engaging recess 322a of the second union 322. In other words, the first union 321 may be turned relative to the second union 322 by 120 degrees. A third engaging block 322b is provided at a predetermined position on an axially extended lower flange of the second union 322 to extend in a circumferential direction by 120°.

Figure 10:
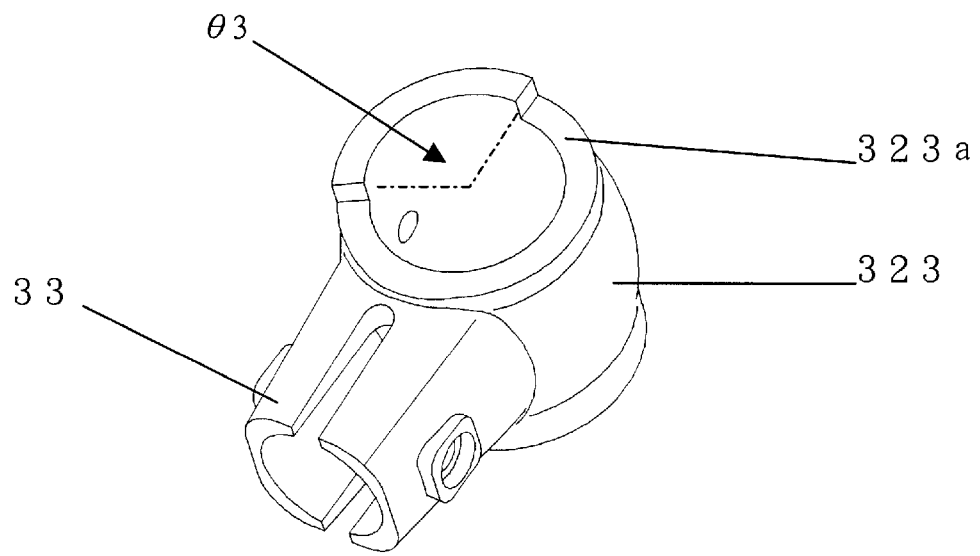
FIG. 10 is an enlarged top perspective view of a third union included in the present invention.

FIG. 10 is a top perspective view of the third union 323. As shown, the third union 323 has an inner bore large enough for it to mount around the inner tube 35 in a loose fit relation. A fourth engaging recess 323a is formed on an axially extended upper flange of the third union 323 to extend in a circumferential direction by an angle θ3 of 240°. The 120°-wide third engaging block 322b of the second union 322 is adapted to interfere with the 240°-wide fourth engaging recess 323a of the third union 323. In other words, the second union 322 may be turned relative to the third union 323 by 120 degrees. As mentioned above, the third union 323 is fixedly connected to the lower end of the inner tube 35 by means of a set of screw and nut S2.

After all components constituting the tripod structure 30 are assembled together, the three legs 31 may be positioned at the same side of the main tube 10, as shown in FIG. 3. At this point, the first engaging block 343 at the lower edge of the locking element 34 is engaged with the first engaging recess 321a at the top of the first union 321; the second engaging block 321c at the bottom of the first union 321 is engaged with the third engaging recess 322a at the top of the second union 322 to abut against an end of the recess 322a for the leg 31 connected to the sideward projected coupling sleeve 33 of the first union 321 to locate immediately above the leg 31 connected to the sideward projected coupling sleeve 33 of the second union 322. Similarly, the third engaging block 322b at the bottom of the second union 322 is engaged with the fourth engaging recess 323a at the top of the third union 323 to abut against an end of the recess 323a for the leg 31 connected to the sideward projected coupling sleeve 33 of the third union 323 to locate immediately below the leg 31 connected to the second union 322.

To extend the three legs 31 in different directions to stably support the main tube 10 in an upright position, as shown in FIG. 4, first slide the locking element 34 upward to compress the spring 38, so that the first engaging block 343 at the bottom of the locking element 34 is released from the first engaging recess 321a at the top of the first union 321. At this point, the leg 31 connected to the first union 321 is allowed to turn by 240 degrees relative to the first engaging block 343 and the leg 31 connected to the third union 323. However, when the first union 321 is turned by 120 degrees, the second union 322 is automatically brought by the first union 321 to turn at the same time. And, when the first union 321 is further turned by another 120 degrees, the second union 322 is brought to turn by 120 degrees relative to the third union 323. This is because the second engaging block 321c at the bottom of the first union 321 circumferentially extends by 120 degrees, and the third engaging recess 322a at the top of the second union 322 circumferentially extends by 240 degrees (see the angle θ2 in FIG. 9A). As a result, when the first union 321 is turned by the first 120 degrees, the second engaging block 321c idles in the third engaging recess 322a; and when the first union 321 is further turned by 120 degrees, the second engaging block 321c is finally brought to contact with an opposite end of the third engaging recess 322a to bring the second union 322 to turn 120 degrees relative to the third union 323.

Therefore, the first union 321 is turned by 240 degrees relative to the third union 323, and the second union 322 is turned by 120 degrees relative to the third union 323. At this point, the first engaging block 343 at the bottom of the locking element 34 is relatively moved to locate above the second engaging recess 321b on the top of the first union 321, and automatically extends into the second engaging recess 321b under a restoring force of the spring 38. After the three unions 321, 322, and 323 are turned in the above-described manner, the three legs 31 are radially extended at equally spaced angles to stably support the main tube 10 in an upright position, as shown in FIG. 4.

To fold the angularly spaced legs 31 to one side of the main tube 10 again, as shown in FIG. 3, the locking element 34 is slid upward again for the first engaging block 343 to disengage from the second engaging recess 321b on the top of the first union 321. Then, the first union 321 is turned in a reverse direction by 240 degrees relative to the third union 323, and the second union 322 is automatically turned in a reverse direction by 120 degrees relative to the third union 323, so that all the three legs 31 are located at the same side of the main tube 10. Finally, the upward slid locking element 34 is released to allow the first engaging block 343 to engage with the first engaging recess 321a again to complete the folding of the three legs 31.

With the above arrangement, the tripod structure 30 for the multi-leg stand of the present invention can be quickly and accurately operated to spacing and folding the legs just by sliding the locking element 34 upward to allow the first and the second union to turn relative to the third union in one fixed direction. What is most important is an operator could complete the above operation by holding the vertical main tube 10 in place with one arm and sliding the locking element 34 upward with the hand of the same arm, and easily complete the folding or spacing of the three legs 31 with the other hand. This would save the operator a lot of time and labor when he or she is busy in setting a stage.

It is noted that, unless the locking element 34 that has a relatively small volume is upward pushed, the three unions 321 to 323 are always firmly held to the locking position after the three legs 31 are moved to the spaced position. The legs 31 would not separate from the spaced position even if any portion of the legs 31 were unexpectedly impacted by a strong force.

The present invention is therefore much safer for use as compared with the conventional tripod.

It is understood numbers of the unions and the legs for the present invention are not limited to three but can be increased as actual needs by changing the angle to be contained between two adjacent legs.

The present invention has been described with a preferred embodiment thereof and it is understood that many changes and modifications in the described embodiment can be carried out without departing from the scope and the spirit of the invention as defined by the appended claims.

What is claimed is:

1. A multi-leg stand, comprising:
   a vertical main tube;
   a set of connecting elements mounted to a top of said main tube for connecting a lighting fixture or a photographic apparatus to a top of said main tube; and
   a tripod structure connected to a bottom of said main tube and including an inner tube to which an elastically movable locking element, a first union, a second union, and a third union are sequentially mounted around said inner tube from top to bottom; each of said first, said second, and said third union having a leg connected thereto to radially extend therefrom, and each of said legs having a downward bent distal end; said locking element having a first engaging block downward projected from a bottom thereof to normally engage with one of a first and a second engaging recess provided on a top of said first union; said first and said second union being provided at respective bottoms with downward projected second and third engaging blocks, that circumferentially extend by a predetermined first angle, adapted to engage with third and fourth engaging recesses, that circumferentially extend by a predetermined second angle, provided on tops of said second and said third union, respectively; whereby when said first engaging block at the bottom of said locking element is engaged with said first engaging recess on the top of said first union, all said legs of said tripod structure are located at the same side of said vertical main tube in a folded position; and when said first engaging block at the bottom of said locking element is engaged with said second engaging recess on the top of said first union, all said legs of said tripod structure are equally angularly spaced to radially extend from said inner tube to stably support said main tube in an upright position; and when said first engaging block of said locking element is elastically released from said first or said second engaging recess on said first union, said first union is turnable in one direction relative to said third union by 240 degrees while automatically brings said second union to turn in the same one direction relative to said third union by 120 degrees.

2. The multi-leg stand as claimed in claim 1, wherein said tripod structure further includes a spring mounted around said inner tube between said locking element and an upper fixing sleeve mounted around an upper end of said locking element; said spring normally pushing said locking element downward to a locking position for said first engaging block to engage with said first or said second engaging recess on the top of said first union, and being compressible to release said locking element from said locking position into a releasing position when a force is applied to said locking element to move said locking element upward.

3. The multi-leg stand as claimed in claim 2, wherein said locking element has an inner bore large enough for said locking element to mount on said inner tube in a loose fit relation, and an upper part of said inner bore of said locking element being expanded to provide a space for receiving a lower end of said spring.

4. The multi-leg stand as claimed in claim 1, wherein said locking element is provided at a predetermined position with a cotter hole, through which a cotter is extended into an axially extended long slot correspondingly provided on a wall of said inner tube to limit said locking element to axially move within a distance defined by said long slot and to restrain said locking element from turning relative to said inner tube.

5. The multi-leg stand as claimed in claim 4, wherein said locking element is externally provided with a reduced annular portion corresponding to said cotter hole, and said reduced annular portion is enclosed with a collar to cover said cotter.

6. The multi-leg stand as claimed in claim 1, wherein said locking element is externally provided at a predetermined position with an expanded portion, on an outer surface of which textures are embossed to facilitate moving of said locking element with one hand holding at said expanded portion.

7. The multi-leg stand as claimed in claim 1, wherein a C-ring is mounted around said inner tube between said first engaging block at the bottom of said locking element and said first and said second engaging recess on the top of said first union.

8. The multi-leg stand as claimed in claim 1, wherein central points of said first and said second engaging recess on the top of said first union are spaced from each other by 240 degrees.

9. The multi-leg stand as claimed in claim 8, wherein said predetermined first angle by which said second engaging block at the bottom of said first union and said third engaging block at the bottom of said second union circumferentially extend is 120 degrees, and said predetermined second angle by which said third engaging recess on the top of said second union and said fourth engaging recess on the top of said third union circumferentially extend is 240 degrees; and wherein said second and said third engaging block interfere with said third and said fourth engaging recess, respectively; whereby when said locking element is moved to said releasing position, said first union is adapted to turn by 240 degrees relative to said third union, and said second union is adapted to turn by 120 degrees relative to said third union.

10. The multi-leg stand as claimed in claim 9, wherein said third union is fixedly connected to a lower end of said inner tube.

11. The multi-leg stand as claimed in claim 1, wherein each of said first, said second, and said third union includes a coupling sleeve, to which an proximal end of one said leg is connected with a set of screw and nut; and wherein each of said legs has a soft pad attached to said downward bent distal end to enable said legs in said spaced position to always stand in a stable horizontal position.

* * * * *